United States Patent Office 3,456,674
Patented July 22, 1969

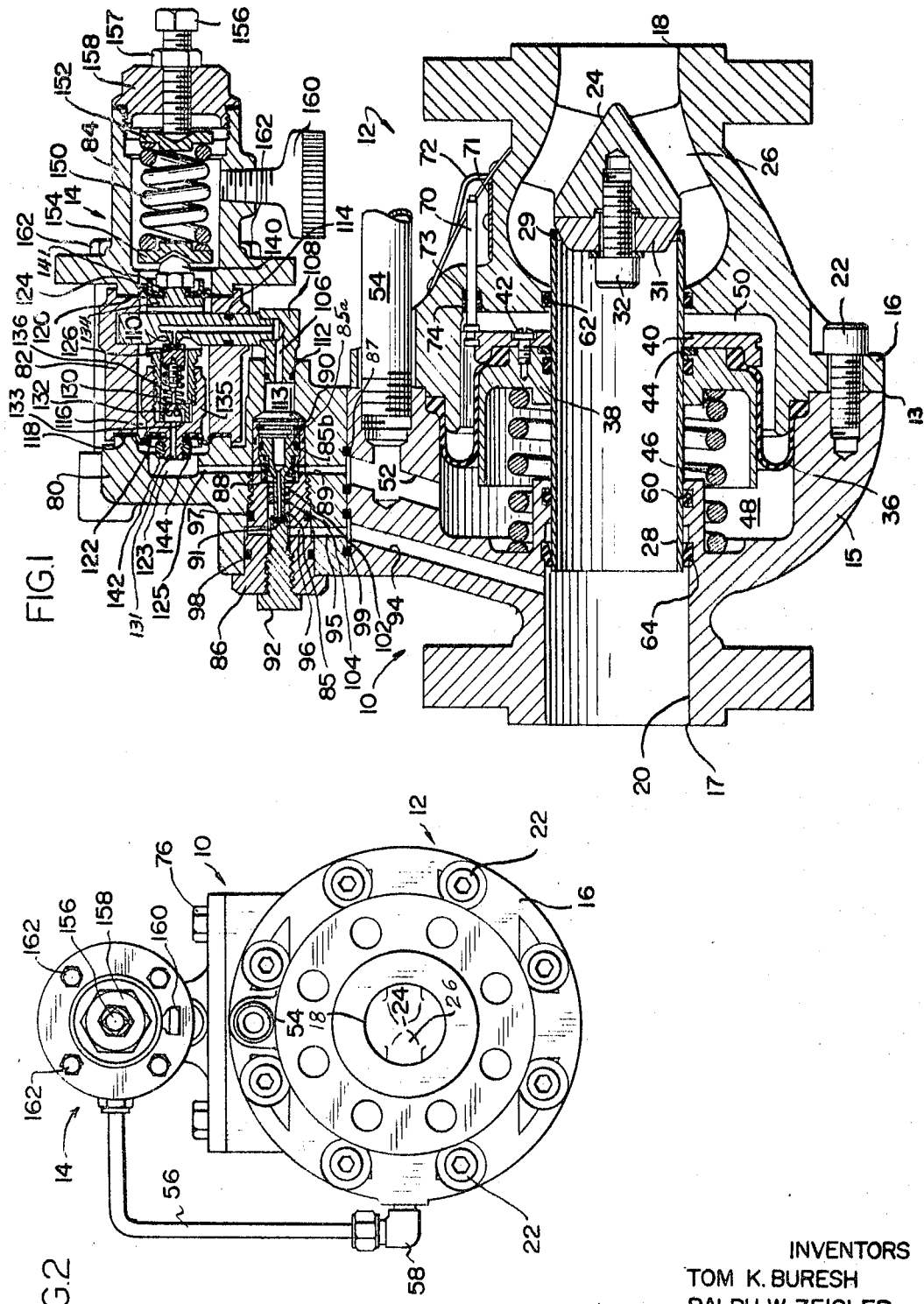

3,456,674
IN-LINE FLOW, PILOT-OPERATED HIGH-PRESSURE GAS REGULATOR
Tom K. Buresh and Ralph W. Zeigler, Marshalltown, Iowa, assignors to Fisher Governor Company, a corporation of Iowa
Filed May 20, 1966, Ser. No. 551,753
Int. Cl. F16k *31/12, 1/12, 31/365*
U.S. Cl. 137—220                    10 Claims

ABSTRACT OF THE DISCLOSURE

A two-stage pilot assembly for use in a high-pressure fluid flow controller adapted to be disposed in a fluid system between a source of variable inlet pressure and a controlled downstream pressure. The pilot assembly includes a differential pressure regulator for reducing the variable relatively high inlet pressure to a pilot supply pressure maintained at a predetermined differential above downstream pressure and pilot control means communicating with the differential pressure regulator for providing pilot loading pressure responsive to variation in downstream pressure for actuating an operating means, for example, a valve.

---

This invention relates generally to a fluid flow pressure controller and, more particularly, to a novel high-pressure gas regulator capable of handling high inlet pressures and high-pressure drops.

The present invention is intended for use primarily as a pressure reducing controller for inlet pressures up to 1,440 p.s.i.g. that are to be reduced to a steady predetermined delivery pressure on the order of 20 to 600 p.s.i.g. A typical practical application for this invention is town border station and city gate station gas regulation where precise and stable metering and venting safety are of great importance.

An important object of this invention is to provide an improved gas regulator which incorporates a unique two-stage pilot design for providing exceptionally precise and stable pressure control. Other objects and advantages of the present invention will become more apparent hereinafter.

The attached drawing illustrates a preferred embodiment of the invention in which:

FIG. 1 is a cross-sectional view of the in-line flow, pilot-operated, high-pressure gas regulator of the present invention; and FIG. 2 is a view from the outlet and of the improved regulator.

Referring now to FIGS. 1 and 2, there is illustrated the in-line flow, pilot-operated, high-pressure gas regulator 10 of the present invention. The improved regulator 10 includes a body-actuator portion 12 to which is secured a two-stage pilot assembly 14.

The body-actuator portion 12 comprises a body member 13 defined by two body sections or halves—the case body half 15 and the base body half 16. The inlet 17 and the outlet 18 in the body are communicated by means of a flow passage 20 defined through the body. Cap screws 22 are provided to retain the two body halves in engagement with one another.

Disposed in the flow path 20 adjacent the outlet 18 is a valve plug support 24. The valve plug support 24 is disposed axially of the flow path 20 and is connected to the valve body by means of a plurality of webs 26. The openings defined between the webs, the valve plug support and body are continuations of the flow passage 20. Valve plug or valve seat 31 is secured to plug support 24 by means of cap screw 32.

Slidably disposed in the flow passage 20 is an elongated annular sleeve 28 which is provided adjacent the right end thereof with a resilient seating member 29 that is adapted to cooperate with the valve seat defined by the valve plug 31 for stopping flow through the flow passage through the sleeve 28.

The sleeve 28 is reciprocated toward and away from the valve plug 24 by means of a diaphragm-type actuator. The actuator consists of a diaphragm 36 which is secured adjacent the outer peripheral edge thereof between the body sections 15 and 16. The inner peripheral edge of the generally annular diaphragm 36 is secured between the cup-shaped member 38 and the ring-like member 40 which are suitably connected to one another, as for example, by machine screws 42. The inner and outer peripheral edges of the diaphragm are each provided with an annular enlargement or bead for facilitating securing the diaphragm at its inner and outer edges. The members 38 and 40 are secured to the sleeve 28 by means of a retaining ring 44 that is clamped between members 38 and 40. Spring 46 biases the actuator and the sleeve 28 carried therewith toward valve-closing position, that is, a position wherein the seating member 29 engages the valve seat 31 on plug support 24 to terminate flow through the flow passage 20.

The diaphragm 36 cooperates with the cavity formed in body 13 to define chambers 48 and 50. The chamber 48 is adapted to communicate with downstream pressure through passage 52 and conduit 54 suitably connected at one end to passage 52 and at the other end to the downstream system. A predetermined loading pressure is applied to the chamber 50 from the pilot 14 through a loading conduit 56 (FIG. 2) joined to an elbow connection 58 that is adapted to communicate with the chamber 50.

Two seals 60 and 62 are provided between the sleeve 28 and the body sections 15 and 16, respectively. The upstream seal 60 isolates the body inlet pressure from the downstream controlled pressure. The downstream seal 62 isolates the pilot loading pressure in chamber 50 from the downstream controlled pressure in the flow passage defined in the cavity between the valve plug support 24 and the body portion 16. Each of the seals 60 and 62 may be fabricated from a two-piece assembly consisting of an elastomer such as synthetic rubber capped by a low-friction member, for example, polytetrafluoroethylene or Teflon. The upstream seal 60 is protected from damage by an annular scraper ring 64 which scrapes the outside surface of the sleeve 28 as the sleeve reciprocates within the body.

A feature of the invention is the tight shut-off provided by the cooperation between the resilient seal member 29 on the end of the sleeve 28 and the valve seat 31. The annular resilient seal member 29, which is bonded to the internal bore of the sleeve 28 adjacent the end thereof, is adapted to engage with the tapered generally conical surface of the valve seat 31. The valve seat 31 is secured by the cap screw 32 to the valve plug support 24 of the body 13 and a suitable sealing washer may be provided to seal the threads of the screw. The force necessary for tight closure of the sleeve 28 against the valve seat is supplied by the spring 46 and by the inlet pressure acting upon the upstream annular area of sleeve 28.

Means are provided for indicating the relative position of the sleeve 28 with respect to the valve seat 31 from external of the valve body 13. Such means include an indicator rod 70 which is operatively connected to the actuator for movement therewith. The right end of the rod moves with respect to a graduated scale 71 secured to the case half 16. A clear plastic or like material protective covering 72 is provided for the graduated scale 71. O-ring 73 and bushing 74 provide a seal for the indicator rod 70.

Referring now to the construction of the two-stage pilot, it is seen that the pilot 14 is affixed to the body-actuator portion by means of cap screws 76 (FIG. 2). The two-stage pilot 14 comprises essentially three sections—a body or housing 80, a diaphragm spacer section 82, and a spring case section 84.

The details of the pilot assembly 14 are best shown in FIG. 1. The body section 80 houses a differential pressure regulator which comprises a piston 85 movable within a piston guide 86 that is suitably secured within an opening in the body section 80. Spring 88 biases the piston 85 to the right, as viewed in FIG. 1, and retaining ring 90 serves as an abutment or stop to limit movement of the piston 85 to the right. Downstream controlled pressure from passage 89 acts upon one side of piston 85a. Passage 89 communicates with passage 52 and an O-ring 87 is provided to isolate downstream controlled pressure. O-ring 85b on piston head 85a seals downstream pressure from the pilot supply pressure on the opposite side of the piston head.

The lower end of the piston 85 is adapted to seat against a piston seat 91 carried on a plug 92 affixed within the piston guide 86.

Inlet pressure is communicated to the chamber defined between the piston seat plug 92 and the piston guide 86 via a passage 94 in the body section 15 and passages 95 and 96 in the body section 80 and piston guide 86, respectively. Suitable O-rings 97, 98 and 99 are provided to isolate inlet pressure.

O-ring 102 and bushing 104 provide proper sealing and guiding for the hollow piston 85. The primary function of the differential pressure regulator is to provide a first stage pressure reduction of inlet pressure being supplied to the pilot. The pressure supplied to the pilot is held differentially higher than the downstream controlled pressure at a magnitude sufficient to insure full stroke of the sleeve 28 via pilot loading pressure against the diaphragm 36. The pilot supply pressure is held at an essentially constant differential pressure above the downstream controlled pressure as the inlet pressure and/or the downstream controlled pressure are varied over a wide pressure range. This constant pilot supply pressure provides more stable and precise control of the downstream controlled pressure.

Gas flows from the differential pressure regulator to the diaphragm spacer section 82 via the generally L-shaped passage 106 defined in the orifice assembly 108. The outlet from the passage 106 is defined by a restricted orifice 110. O-ring seal means 112 and 114 are provided between the orifice assembly 108 and the body section 80 and the diaphragm spacer section 82, respectively. The chamber 116 defined within the diaphragm spacer section 82 communicates with the chamber 50 within the valve body 13 by means of loading tube or conduit 56.

The diaphragm spacer section 82 houses the two pilot diaphragms 118 and 120, two diaphragm plates 122 and 124, valve disc assembly 126, spring 130, bleed valve 132, bleed orifice 133, yoke 134, and adaptor 135. The valve disc assembly 126, spring 130, bleed orifice 133 and bleed valve 132 are secured as a unit by threading the male thread of the bleed valve 132 into the female thread of an opening in the valve disc assembly 126. The yoke 134 is suitably connected to the adaptor 135, as for example, by the threaded connections shown, to complete the assembly, with the internal bore 136 of the yoke 134 providing proper alignment and guiding for the valve disc assembly 126. It is preferred that the valve disc assembly have an outer periphery that is non-circular, for example, the valve disc assembly may be hexagonal in cross section to provide for not only proper sliding and guide movement of the valve disc assembly within the bore in the yoke 134 but also to provide a flow passage around valve disc assembly 126 for downstream bleed of pilot loading pressure.

The diaphragm 120 is secured at its outer peripheral edge between the body section 82 and the spring case 84. The inner peripheral edge of the diaphragm 120 is secured between diaphragm plate 124 and yoke 134. The fastening means for securing the inner peripheral edge of diaphragm 120 between the yoke 134 and the diaphragm plate 124 may comprise a cap nut 140 which bears against a sealing washer 141 disposed between the cap nut 140 and the diaphragm plate 124.

The outer peripheral edge of the diaphragm 118 is clamped between the body section 80 and the diaphragm spacer section 82. The inner peripheral edge of the diaphragm 118 is retained between the adaptor 135 and the diaphragm plate 122 by means of a hex nut 142 and a sealing washer 144.

Spring case 84 houses the pilot spring 150 which bears at its ends against spring seats 152 and 154. The lower spring seat 154 abuts the cap nut 140 and the upper spring 152 is engaged by adjusting screw 156 that may be retained in the desired adjusted position by means of a lock nut 157. Screw 156 is adjusted so as to balance the spring force against the downstream controlled pressure. The spring 150 biases the yoke and adaptor unit against downstream controlled pressure to balance the pilot at a predetermined regulating point. The spring case cap 158 within which the adjustment screw 156 is threaded provides a weather-tight enclosure for the spring case 84. Vent 160 provides a bug proof vent for the spring case 84.

The three sections of the pilot assembly are secured to one another by means of a plurality of cap screws 162.

Downstream pressure is communicated from the passage 52 to the chamber 123 through the passage 89 in the body section 80.

In operation of the in-line flow, pilot-operated, high-pressure regulator of this invention, high pressure is applied to the inlet 17. Inlet pressure is communicated via the passages 94 and 95 to the chamber defined between the piston seat plug 92 and the piston 85. Spring 88 normally biases piston 85 away from seat 91. Gas flows through hollow piston 85 at a reduced pressure to chamber 113 to provide a pilot supply pressure in chamber 113 and passage 106. The differential pressure regulator provides a first stage pressure reduction of the inlet pressure and such lower pressure is supplied to the pilot through the passage 106 in the orifice assembly 108.

The components in housing 82 provides the second stage of pilot assembly 14. Such components function as a pressure responsive control means operative in response to variation in downstream controlled pressure to provide a pilot loading pressure differentially higher than the downstream controlled pressure as the inlet pressure and gas flow rates are varied over a wide range. Spring 150 biases the yoke and adaptor assembly in opposition to the downstream pressure in the chamber 123 acting against the diaphragm 118. The pilot is balanced at a regulating point and the loading pressure within chamber 116 is transmitted to the chamber 50 by means of the loading conduit 56. The loading pressure is at a value sufficient to move the diaphragm assembly and sleeve 28 connected thereto away from the valve seat 31 a sufficient distance to establish regulated flow through the valve body. The pilot supply pressure in chamber 113 and passage 106 is held at a varying differential pressure above the downstream controlled pressure as the inlet pressure and/or the downstream controlled pressure are varied over a wide range. The differential pressure regulator prevents over-pressure on the diaphragm 36 in the event that downstream controlled pressure falls below a predetermined set point.

A feature of this invention is the maintenance of a constant ratio between change in inlet pressure and change in pilot supply pressure by the differential pressure regulator. In one present form of the invention, the ratio may be 20:1, that is, for every 20 p.s.i.g. change in inlet pressure, there will be a corresponding 1 p.s.i.g. change in pilot supply pressure. It is assumed that it is desired to maintain a substantially constant downstream controlled pressure at a predetermined value as the inlet pressure varies. This more constant pilot supply pressure provides more stable and precise control of the downstream controlled pressure. Preferably, the pilot and the body actuator are constructed and arranged so that the pressure drop across the differential pressure regulator is less than that across the main valve in body actuator portion 12 by an amount sufficient to allow a higher loading pressure to the main valve. The pilot compensates in proportion to pressure drop across the main valve.

If there is an unbalancing of the downstream controlled pressure, the diaphragm 118 will be actuated to move the yoke and adaptor unit to supply the proper loading pressure. For example, if downstream controlled pressure increases, the pressure in chamber 123 will increase, moving the yoke and adaptor unit to restrict the opening from orifice 110. Loading pressure will decrease, decreasing pressure in chamber 50 and permitting sleeve 28 to be moved so as to restrict flow through the flow passage in body 13. The loading pressure is decreased by closing orifice 110 against the resilient seating disc carried on valve disc assembly 126 and at the same time opening bleed valve 132 as the yoke and adaptor unit continue movement to the right. Gas pressure bleeds from chamber 116 through passage 131 to chamber 123, which is at downstream controlled pressure.

If downstream controlled pressure decreases, the pressure in chamber 123 will decrease. There will be an imbalance in the pilot and the opening from orifice 110 will be increased as the resilient disc carried in valve disc assembly 126 moves away from orifice 110. The loading pressure increases in chamber 116 and this increase is transmitted through line 56 to chamber 50. Diaphragm 36 is moved to the left as viewed in FIG. 1 and sleeve 28 is moved away from valve plug 31 to permit increased flow through body 13.

Higher pilot loading pressure is required for higher inlet pressure in order to overcome increased force acting on the sleeve 28 tending to move the sleeve toward valve plug engaging position. Likewise, higher pilot loading pressure is required if the downstream controlled pressure is increased to provide proper control of flow through the main valve in the body-actuator portion 12. Less pilot loading pressure is required for reduced inlet pressure or reduced downstream controlled pressure, since there is less force acting on the sleeve 28 tending to move it toward valve closing position. The differential pressure regulator is operative to vary the pilot supply pressure in proportion to the change in inlet pressure and downstream controlled pressure.

Bleed valve 132 operates to permit bleed of pressure from chamber 116 to chamber 123 through passage 131 in adaptor 135 so as to enable faster responsive movement of diaphragms 118 and 120 and the elements moved therewith.

By the present invention, there has been provided a regulator suitable for single or multiple stage pressure reduction in a pipeline over a wide operating pressure range. The unique, two-stage pilot design cooperates with the actuator in the valve member to provide exceptionally precise and stable pressure control. The regulator includes a valve member of compact, single-seated design that provides a tight shut-off of fluid flow. The valve member has a streamlined flow passage which provides exceptionally high flow capacities.

We claim:

1. For use in a high-pressure gas controller adapted to be disposed in a fluid system, a two-stage pilot assembly comprising housing means, first passage means for supplying a variable upstream pressure, a differential pressure regulator in the housing means communicating with the first passage means for reducing the variable upstream pressure to pilot supply pressure which is differentially higher pressure than downstream pressure, pressure responsive control mean for producing a pilot loading pressure to actuate an operating means, second passage means for supplying downstream pressure to the pressure responsive control means, third passage means communicating the differential pressure regulator with the pressure responsive control means for supplying pilot supply pressure to the pressure responsive control means, the pressure responsive control means including a movable assembly, means during the movable assembly in a first direction, with the movable assembly being moved in the opposite direction by downstream pressure supplied through the third passage means, said movable assembly including valve means for cooperating with the outlet from the second passage means to control fluid flow into the pilot loading chamber in the housing means.

2. For use in a high-pressure gas controller, a two-stage pilot assembly adapted to be responsive to variable inlet pressure to provide in cooperation with the gas controller controlled downstream pressure, said pilot assembly including housing means, first passage means for supplying variable inlet pressure to the housing means, second passage means for supplying downwstream controlled pressure to the housing means, a differential pressure regulator for reducing the variable inlet pressure to pilot supply pressure maintained at a differential above said downstream pressure, pressure responsive control means in the housing means for supplying a predetermined pilot loading pressure to an operating means and communicating meanst for supplying pilot supply pressure from the differential pressure regulator to the pressure responsive control means, said pressure responsive control means operative in response to variation in downstream controlled pressure to provide pilot loading pressure to operate the operating means.

3. A device as in claim 2 wherein the differential pressure regulator is operative to maintain a constant ratio between change in inlet pressure and change in pilot supply pressure.

4. A device as in claim 2 wherein said communicating means includes a restricted opening through which gas at said pilot supply pressure is discharged and said pressure responsive control means includes movable valve means for cooperating with said restricted opening to provide within said pressure responsive control means said pilot loading pressure.

5. A device is in claim 4 wherein the pressure responsive control means includes a diaphragm assembly supporting said valve means, said downstream controlled pressure urging said diaphragm assembly in one direction tending to close said restricted opening, means for biasing the diaphragm assembly in an opposite direction tending to open said restricted opening, the forces on the diaphragm assembly being balanced at a predetermined value, with variations in downstream controlled pressure causing controlled variations in pilot loading pressure.

6. A device is in claim 5 wherein said diaphragm assembly includes a pair of spaced apart diaphragms defining within said housing means a pilot loading chamber, and said restricted opening of said communicating means is disposed between the diaphragm in said pilot loading chamber, the valve means being movable with the diaphragms to control the discharge of pilot supply pressure into the pilot loading chamber.

7. A device as in claim 6 wherein said diaphragm assembly includes bleed valve means for selectively communicating pilot loading pressure from the pilot loading chamber to downstream controlled pressure.

8. A device as in claim 2 wherein said differential pressure regulator includes a spring-biased hollow movable piston member cooperating with a fixed seat to reduce inlet pressure to said predetermined lower pilot supply pressure, the differential pressure regulator being operative to maintain a constant ratio between change in inlet pressure and change in pilot supply pressure when the downstream controlled pressure remains constant.

9. A device as in claim 2 wherein the operating means comprises a valve member comprising a body having an inlet and outlet and a passage therethrough communicating the inlet and the outlet, valve plug means fixedly secured in the body and disposed in the passage, a sleeve member movably disposed in the passage, actuator means in said body for reciprocating the sleeve member in the body so as to move an end of the sleeve member toward and away from the valve plug means for controlling the flow of gas through the body, said pilot loading pressure being applied to one surface of the actuator means for urging the sleeve member away from the valve plug means, the pilot supply pressure being differentially higher than the downstream controlled pressure to insure full stroke of the sleeve member.

10. A device as in claim 9, including spring means for biasing the sleeve member toward engagement with the valve plug means.

References Cited

UNITED STATES PATENTS

| 871,260 | 11/1907 | Dyer | 137—492 X |
| 2,078,106 | 4/1937 | Temple | 137—492.5 |
| 2,745,429 | 5/1956 | Crookston | 137—492.5 |
| 3,253,608 | 5/1966 | Davis | 137—220 |

FOREIGN PATENTS 847,608  9/1960  Great Britain.

HENRY T. KLINKSIEK, Primary Examiner

M. O. STURM, Assistant Examiner

U.S. Cl. X.R.

137—492.5

UNITED STATES PATENT OFFICE
CERTIFICATE OF CORRECTION

Patent No. 3,456,674                              July 22, 1969

Tom K. Buresh et al.

It is certified that error appears in the above identified patent and that said Letters Patent are hereby corrected as shown below:

Column 6, line 13, "during" should read -- urging --.

Signed and sealed this 18th day of August 1970.

(SEAL)
Attest:

Edward M. Fletcher, Jr.                      WILLIAM E. SCHUYLER, JR.
Attesting Officer                               Commissioner of Patents